US011732186B2

(12) United States Patent
Boercker et al.

(10) Patent No.: US 11,732,186 B2
(45) Date of Patent: Aug. 22, 2023

(54) CORE/SHELL NANOCRYSTALS WITH COPPER SULFIDE CORES AND LEAD SULFIDE SHELLS

(71) Applicant: The Government of the United States of America, as represented by the Secretary of the Navy, Arlington, VA (US)

(72) Inventors: Janice E. Boercker, Fairfax, VA (US); Sarah F. Brittman, Washington, DC (US); Joseph G. Tischler, Alexandria, VA (US); Patrick Y. Yee, Washington, DC (US); Chase T. Ellis, Silver Spring, MD (US); Paul D. Cunningham, Baltimore, MD (US); Rhonda M. Stroud, Washington, DC (US); Michael H. Stewart, Springfield, VA (US); Steven C. Erwin, Alexandria, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 249 days.

(21) Appl. No.: 17/238,265

(22) Filed: Apr. 23, 2021

(65) Prior Publication Data
US 2021/0332291 A1 Oct. 28, 2021

Related U.S. Application Data

(60) Provisional application No. 63/014,801, filed on Apr. 24, 2020.

(51) Int. Cl.
*C09K 11/56* (2006.01)
*C09K 11/58* (2006.01)
(Continued)

(52) U.S. Cl.
CPC ............ *C09K 11/56* (2013.01); *C09K 11/582* (2013.01); *C09K 11/661* (2013.01); *B82Y 20/00* (2013.01); *B82Y 40/00* (2013.01)

(58) Field of Classification Search
CPC ..... C09K 11/56; C09K 11/661; C09K 11/582; B82Y 20/00; B82Y 40/00
See application file for complete search history.

(56) References Cited

U.S. PATENT DOCUMENTS

| 9,619,754 B2 | 4/2017 | Gammon et al. |
| 10,921,519 B2 | 2/2021 | Grim et al. |
| 11,150,495 B2 | 10/2021 | Grim et al. |

FOREIGN PATENT DOCUMENTS

| KR | 20130031157 A | 3/2013 |
| KR | 101668480 B1 | 10/2016 |

OTHER PUBLICATIONS

E. M. Purcell, "Spontaneous emission probabilities at radio frequencies" Phys. Rev. 69, 681 (1946).
(Continued)

*Primary Examiner* — C Melissa Koslow
(74) *Attorney, Agent, or Firm* — US Naval Research Laboratory; Scott Hatfield

(57) ABSTRACT

A process for synthesizing $Cu_{2-x}S/PbS$ core/shell nanocrystals. Pb-oleate is mixed with 1-octadecene and heated to 60° C. $Cu_{2-x}S$ core solution and bis(trimethylsilyl)sulfide stock solution are added and the mixture is stirred at 60° C. for 6 minutes to form the PbS shell around the $Cu_{2-x}S$ nanocrystal cores. The flask is cooled and acetonitrile and toluene is added and the mixture is centrifuged to precipitate and remove the $Cu_{2-x}S/PbS$ core/shell nanocrystals from the reaction mixture. The reaction also produces homogeneously nucleated PbS nanocrystals, which are removed from the $Cu_{2-x}S/PbS$ core/shell reaction mixture via size-selective precipitation. By tailoring the amounts of Pb-oleate
(Continued)

and bis(trimethylsilyl)sulfide stock solution in the reaction vessel, while maintaining their molar ratio of 1.5:1 and the number of $Cu_{2-x}S$ cores in the reaction, $Cu_{2-x}S$/PbS core/shell nanocrystals having a predetermined shell thickness of PbS, and thus a predetermined level of chemical stability, can be obtained.

20 Claims, 12 Drawing Sheets

(51) Int. Cl.
    *C09K 11/66*     (2006.01)
    *B82Y 40/00*     (2011.01)
    *B82Y 20/00*     (2011.01)

(56) References Cited

OTHER PUBLICATIONS

O. Kulakovich et al., "Enhanced Luminescence of CdSe Quantum Dots on Gold Colloids," Nano Letters 2(12):1449-1452 (2002).
N.T. Fofang et al., "Plexcitonic Nanoparticles: Plasmon-Exciton Coupling in Nanoshell-J-Aggregate Complexes," Nano Letters 8(10): 3481-348 (2008).
P. Reiss et al., "Core/Shell Semiconductor Nanocrystals," Small 5(2): 154-168 (2009).
B. Ji et al., "Non-blinking quantum dot with a plasmonic nanoshell resonator," Nature Nanotechnology 10(2):170-175 (2015).
A. Litvin et al., "Strong Enhancement of PbS Quantum Dot NIR Emission Using Plasmonic Semiconductor Nanocrystals in Nanoporous Silicate Matrix," Advanced Optical Materials 1701055 (2018).
A. P. Litvin et al., "Thin Layer of Semiconductor Plasmonic Nanocrystals for the Enhancement of NIR Fluorophores," The Journal of Physical Chemistry C 122(35): 20469-20475 (2018).
Michael J. Turo et al., "Crystal-Bound vs Surface-Bound Thiols on Nanocrystals," ACS Nano 2014, 8, 10, 10205-10213.
L. De Trizio et al., "Forging Colloidal Nanostructures Via Cation Exchange Reactions," Chemical Reviews 2016, 116 (18) 10852-10887.
I. Moreels, et al., "Size-Dependent Optical Properties of Colloidal PbS Quantum Dots," ACS Nano 2009, 3 (10) 3023030.
Stouwdam. J. W., "Photostability of Colloidal PbSe and PbSe/PbS Core/Shell Nanocrystals in Solution and in the Solid State", J. Phys. Chem. C, 2007, vol. 111, Issue 3, pp. 1086-1092.
Huang, X. et al., "Right Cu2-xS@MnS Core-Shell Nanoparticles as a Photo/H2O2-Responsive Platform for Effective Cancer Theranostics", 2019, vol. 6, Issue 20, pp. 1901461(1-12).
Serrano, T. et al., "One pot synthesis of PbS/Cu2S core-shell nanoparticlesand their optical properties, Revista Mexicana de Fisica", 2014, vol. 60, No. 1, pp. 14-21.
Search Report and Written Opinion dated Oct. 21, 2021 in corresponding International Application No. PCT/US2021/028746.
K. E. Knowles, et al., "Luminescent Colloidal Semiconductor Nanocrystals Containing Copper: Synthesis, Photophysics, and Applications" Chem. Rev. 2016, 116, 18, USA, pp. 10820-10851.
L. You, et al., "Boosting the thermoelectric performance of PbSe through dynamic doping and hierarchical phonon scattering" Energy Environ. Sci 2018, 11, UK, pp. 1848-1858.
M. Li, "Room temperature aqueous-based synthesis of copper-doped lead sulfide nanoparticles for thermoelectric application," Chemical Engineering Journal, vol. 433, part 3, Apr. 2022, 133837, Netherlands (10 pages).
B.Touati, et al., "Engineering of electronic and optical properties of PbS Thins films via Cu doping," Superlattices and Microstructures, vol. 97, Sep. 2016, USA, pp. 519-528.
H. Soetedjo, et al., "Deposition of Cu-doped PbS thin films with low resistivity using DC sputtering," Results in Physics 8, (2018), Netherlands, pp. 903-907.
M. Shkir, "Microwave-assisted synthesis of Cu doped PbS nanostructures with enhanced dielectric and electrical properties for optoelectronic applications," Materials Science & Engineering B 271, (2021) 115268, UK, (9 pages).
P.Y. Yee, et al., "Cu2-xS/PbS Core/Shell Nanocrystals with Improved Chemical Stability," Chem. Mater. 2021, 33, USA, pp. 6685-6691.
I. Kriegel, I., et al., "Tuning the Excitonic and Plasmonic Properties of Copper Chalcogenide Nanocrystals," J. Amer. Chem. Soc. 2011, 3 (134), USA, pp. 1583-1590.
W. Byrks, et al., "Supramolecular Precursors for the Synthesis of Anisotropic Cu2S Nanocrystals," J. Am. Chem. Soc. 2014, 136, 17, USA, pp. 6175-6178.
G. Askelrod, et al., "Efficient Nanosecond Photoluminescence from Infrared PbS Quantum Dots Coupled to Plasmonic Nanoantennas," ACS Photonics 2016, 3, USA, pp. 1741-1746.
D. Smith, et al., "Tuning the Synthesis of Ternary Lead Chalcogenide Quantum Dots by Balancing Precursor Reactivity," ACS Nano 2011, 5, 1, USA, pp. 183-190.
A. Stavrinadis, et al., "Heterovalent cation substitutional doping for quantum dot homojunction solar cells," Nature Communications 2013, 4, Article No. 2981, USA (7 pages).
T. Kuzuya, et al., "Water-free Solution Synthesis of Monodisperse Cu2S Nanocrystals" Chemistry Letters (2004), vol. 33, No. 3, Japan, pp. 352-353.

AlB₂

CuAu

Cu₃Au

NaZn₁₃

CORE/SHELL NANOCRYSTALS WITH COPPER SULFIDE CORES AND LEAD SULFIDE SHELLS

CROSS-REFERENCE

This Application is a Nonprovisional of and claims the benefit of priority under 35 U.S.C. § 119 based on U.S. Provisional Patent Application No. 63/014,801 filed on Apr. 24, 2020. The Provisional Application and all references cited herein are hereby incorporated by reference into the present disclosure in their entirety.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navy.mil, referencing Navy Case #113009.

TECHNICAL FIELD

The present disclosure relates to $Cu_{2-x}S/PbS$ core/shell nanocrystals, a method for making such $Cu_{2-x}S/PbS$ core/shell nanocrystals, and 3D binary superlattices and other hybrid nanostructures formed from such $Cu_{2-x}S/PbS$ core/shell nanocrystals.

BACKGROUND

Exciton-plasmon coupling can be used to increase a material's absorption coefficient and/or photoluminescence efficiency by means of a phenomenon known as the Purcell effect. See E. M. Purcell, "Spontaneous emission probabilities at radio frequencies" *Phys. Rev.* 69, 681 (1946). Exciton-plasmon coupling has been used to enhance the performance of optoelectronic devices such as solar cells and infrared detectors.

One key parameter to this coupling is the physical distance between the exciton material and plasmonic material; if they are too close together, the plasmon can quench the exciton, while if they are too far away from each other, no enhancement occurs. See O. Kulakovich et al., "Enhanced Luminescence of CdSe Quantum Dots on Gold Colloids," *Nano Letters* 2(12): 1449-1452 (2002).

Another key parameter is the energy overlap of the plasmonic and excitonic components; direct overlap leads to maximum coupling, while no overlap results in no coupling. See N. T. Fofang et al., "Plexcitonic Nanoparticles: Plasmon-Exciton Coupling in Nanoshell—J-Aggregate Complexes," *Nano Letters* 8(10): 3481-348 (2008); see also P. Reiss et al., "Core/Shell Semiconductor Nanocrystals," *Small* 5(2): 154-168 (2009).

Combining the excitonic and plasmonic materials into core/shell nanocrystals creates a uniform and controllable distance between them. Although core/shell nanocrystals have been created that result in exciton-plasmon coupling and enhanced optical properties, this has only been shown in the range of visible wavelengths. For example, Ji et al. saw exciton-plasmon coupling in the visible range, which led to faster non-blinking emission of the core CdSe/CdS nanocrystals. See B. Ji et al., "Non-blinking quantum dot with a plasmonic nanoshell resonator," *Nature Nanotechnology* 10(2): 170-175 (2015). This is because metallic plasmonic nanocrystals, such as Au, have a plasmonic energy limited to the visible region. In order to couple infrared excitons and plasmons in a core/shell nanocrystal, the typically used metallic plasmonic component must be replaced by a doped plasmonic nanocrystal such as $Cu_{2-x}S$, which has a plasmonic component in the infrared. However, this has not previously been successfully achieved.

There have been attempts to develop nanostructures that obtain such exciton-plasmon enhancement in the infrared, but such attempts have generally not been satisfactory. For example, Litvin et al. have combined $Cu_{2-x}Se$ and PbS nanocrystals randomly in a silicate matrix and as films on top of each other. However, these geometries do not allow for controlled uniform electric field enhancements around each exciton and so do not provide a way to optimize the distance between the exciton and plasmon for optimization of coupling. See A. Litvin et al., "Strong Enhancement of PbS Quantum Dot NIR Emission Using Plasmonic Semiconductor Nanocrystals in Nanoporous Silicate Matrix," *Advanced Optical Materials* 1701055 (2018); see also A. P. Litvin et al., "Thin Layer of Semiconductor Plasmonic Nanocrystals for the Enhancement of NIR Fluorophores," *The Journal of Physical Chemistry C* 122(35): 20469-20475 (2018).

The present invention solves these problems by passivating the $Cu_{2-x}S$ nanocrystals with a PbS shell such that they can be combined with an excitonic nanocrystal such as PbS in binary superlattices with uniform and controllable distances between the $Cu_{2-x}S$ and PbS nanocrystals.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides a process for synthesizing $Cu_{2-x}S/PbS$ core/shell nanocrystals.

In accordance with the present invention, a PbS shell can be deposited onto a $Cu_{2-x}S$ core to produce a $Cu_{2-x}S/PbS$ core/shell nanocrystal in a process that includes steps of mixing a predetermined amount of Pb-oleate with 1-octadecene in a reaction flask within an $N_2$ glovebox; removing the flask from the glovebox and heating the mixture under an argon atmosphere to 60° C.; while maintaining the temperature of the mixture at 60° C., adding a predetermined amount of a $Cu_{2-x}S$ core solution and a predetermined amount of bis(trimethylsilyl)sulfide stock solution at a Pb-oleate:bis (trimethylsilyl)sulfide molar ratio of 1.5:1 to the flask and rapidly stirring the mixture (700 rpm) for 6 minutes to form the $Cu_{2-x}S/PbS$ core/shell nanocrystals; cooling the flask to room temperature; returning the flask to the $N_2$ glovebox, adding toluene and acetonitrile to the flask; and placing the mixture in a centrifuge tube and centrifuging to precipitate and remove the $Cu_{2-x}S/PbS$ core/shell nanocrystals from the reaction mixture. The $Cu_{2-x}S$ core solution typically has a concentration of 29 μM of $Cu_{2-x}S$ nanocrystals in hexane, with 2 mL of the $Cu_{2-x}S$ core solution typically being used, but other $Cu_{2-x}S$ nanocrystal concentrations and other amounts of the $Cu_{2-x}S$ core solution can be used, with all such concentrations and amounts being deemed to be within the scope of the present disclosure.

In addition to the $Cu_{2-x}S$/PbS core/shell nanocrystals, the reaction also results in the formation of homogeneously nucleated PbS nanocrystals, as well as residual unreacted precursors and byproducts. Thus, in an additional step in the method in accordance with the present invention, the $Cu_{2-x}S$/PbS core/shell nanocrystals can be separated from these unreacted precursors, byproducts, and homogeneously nucleated PbS through a purification process whereby the $Cu_{2-x}S$/PbS core/shell nanocrystals and PbS nanocrystals are removed via size-selective precipitation using toluene and acetonitrile as the solvent/nonsolvent pair.

By tailoring the amounts of Pb-oleate and bis(trimethylsilyl)sulfide stock solution in the reaction vessel, while maintaining their molar ratio of 1.5:1, $Cu_{2-x}S$/PbS core/shell nanocrystals having a predetermined shell thickness, and thus a predetermined level of chemical stability can be obtained.

DETAILED DESCRIPTION

The aspects and features of the present invention summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

As described in more detail below, the present invention provides core/shell nanocrystals consisting of a copper sulfide ($Cu_{2-x}S$) core surrounded by a lead sulfide (PbS) shell and a method for forming the same. The present invention also enables the formation of binary superlattices of $Cu_{2-x}S$/PbS core/shell nanocrystals and PbS nanocrystals that can uniformly control the distance between the plasmonic $Cu_{2-x}S$/PbS core/shell and excitonic PbS nanocrystals for optimization of the Purcell effect for high-performance nanocrystal optoelectronic devices.

Figure 1:
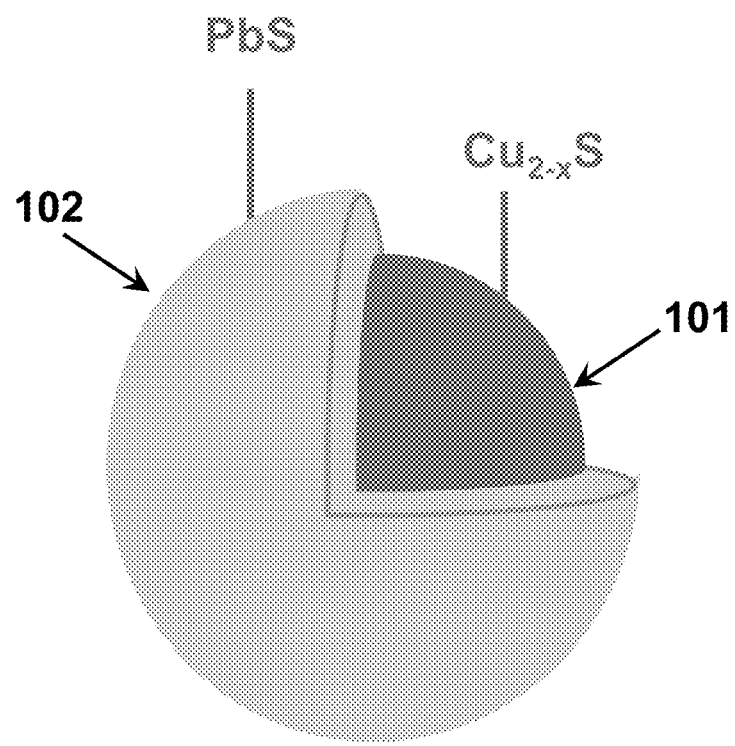
FIG. 1 is a block schematic illustrating an exemplary $Cu_{2-x}S$/PbS core/shell nanocrystal that can be synthesized in accordance with the present invention.

FIG. 1 is a block schematic illustrating an exemplary $Cu_{2-x}S$/PbS core/shell nanocrystal produced in accordance with the present invention, which comprises a $Cu_{2-x}S$ core 101 surrounded by a PbS shell 102. As described in more detail below, by tailoring the number of moles of Pb-oleate and bis(trimethylsilyl)sulfide used, a PbS shell having a predetermined number of monolayers, and thus a predetermined level of chemical stability, can be obtained.

The $Cu_{2-x}S$/PbS core/shell nanocrystals in accordance with the present invention enable the chemical stabilization and solubility of large (>8 nm) $Cu_{2-x}S$ nanocrystals, which enables the construction of hybrid nanostructures such as binary superlattices of $Cu_{2-x}S$/PbS core/shell nanocrystals and PbS nanocrystals without the quenching of the PbS exciton.

The PbS shell blueshifts the $Cu_{2-x}S$ core's plasmon energy such that it overlaps with the PbS nanocrystal's exciton energy.

By varying the number of Cu vacancies in the $Cu_{2-x}S$ cores and/or the diameter of the PbS nanocrystals combined with these $Cu_{2-x}S$/PbS core/shell nanocrystals in binary superlattices in accordance with the present invention, the energies of the $Cu_{2-x}S$/PbS core/shell plasmon and the PbS exciton can be tuned to obtain a predetermined increase in exciton-plasmon interactions. Furthermore, increasing the thickness of the PbS shell on the $Cu_{2-x}S$ cores results in a predetermined reduction in quenching of photonic emission from the PbS nanocrystals.

As described in more detail below, a PbS shell can be deposited on a $Cu_{2-x}S$ core to produce a $Cu_{2-x}S$/PbS core/shell nanocrystal in a process that includes the following steps:

mixing a predetermined amount of Pb-oleate with 1-octadecene in a reaction flask within an $N_2$ glovebox;

removing the flask from the glovebox and heating the mixture under an argon atmosphere to 60° C.;

while maintaining the temperature of the mixture at 60° C., adding a predetermined amount of a $Cu_{2-x}S$ core solution and a predetermined amount of bis(trimethylsilyl)sulfide stock solution at a Pb-oleate:bis(trimethylsilyl)sulfide molar ratio of 1.5:1 to the flask and rapidly stirring the mixture (700 rpm) for 6 minutes to form the $Cu_{2-x}S/PbS$ core/shell nanocrystals;

cooling the flask to room temperature;

returning the flask to the $N_2$ glovebox, adding toluene and acetonitrile to the flask; and placing the mixture in a centrifuge tube and centrifuging to precipitate and remove the $Cu_{2-x}S/PbS$ core/shell nanocrystals from the reaction mixture.

The $Cu_{2-x}S$ core solution typically has a concentration of 29 µM of $Cu_{2-x}S$ nanocrystals in hexane, with 2 mL of the $Cu_{2-x}S$ core solution typically being used, but other $Cu_{2-x}S$ nanocrystal concentrations and other amounts of the $Cu_{2-x}S$ core solution can be used, with all such concentrations and amounts being deemed to be within the scope of the present disclosure.

In addition to the $Cu_{2-x}S/PbS$ core/shell nanocrystals, the reaction also results in the formation of homogeneously nucleated PbS nanocrystals, as well as residual unreacted precursors and byproducts. Thus, in an additional step in the method in accordance with the present invention, the $Cu_{2-x}S/PbS$ core/shell nanocrystals can be separated from these unreacted precursors, byproducts, and homogeneously nucleated PbS through a purification process described in more detail below whereby the $Cu_{2-x}S/PbS$ core/shell nanocrystals and PbS nanocrystals are removed via size-selective precipitation using toluene and acetonitrile as the solvent/nonsolvent pair.

In some embodiments, one or more of the Pb-oleate, the $Cu_{2-x}S$ solution, and the bis(trimethylsilyl)sulfide stock solution can be produced as part of the process, while in other embodiments, one or more of these starting materials can be previously prepared or obtained from other, e.g., commercial, sources.

In some embodiments, the $Cu_{2-x}S/PbS$ core/shell nanocrystals and PbS nanocrystals can be further coated with an additional material such as $SiO_2$. By tuning the thickness of this additional layer in these $Cu_{2-x}S/PbS/SiO_2$ core/shell/shell nanocrystals and $PbS/SiO_2$ core/shell nanocrystals, the distance between the plasmonic $Cu_{2-x}S$ and the excitonic PbS nanocrystals can be tuned so as to optimize the Purcell effect in dimers formed from the coated $Cu_{2-x}S/PbS$ nanocrystals and PbS nanocrystals.

Figure 2A:
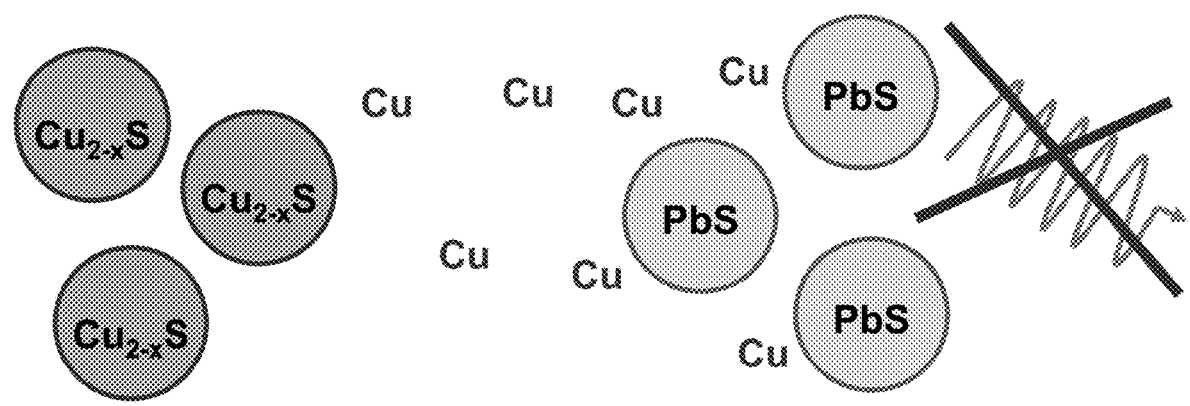
FIGS. 2A and 2B are block schematics illustrating the way in which copper atoms escape from the surface of $Cu_{2-x}S$ cores without a PbS shell, quenching the photoluminescence of neighboring PbS nanocrystals, while copper atoms do not escape from $Cu_{2-x}S$ cores having a PbS shell formed thereon in accordance with the present invention, enabling photoluminescence to occur.

FIG. 2A is a block schematic illustrating that if bare $Cu_{2-x}S$ cores and PbS nanocrystal are mixed together in a solution, the Cu from the core escapes from the $Cu_{2-x}S$ core surface and chemically interacts with nearby PbS nanocrystals and quenches their photoluminescence. This is a big problem for coupling excitons and plasmons in binary superlattices because the $Cu_{2-x}S$ and PbS nanocrystals are mixed together in a solution to assemble the binary superlattices; therefore, the PbS exciton is always quenched in $Cu_{2-x}S$-PbS binary superlattices, and thus it is impossible to study exciton-plasmon coupling in these structures.

Figure 2B:
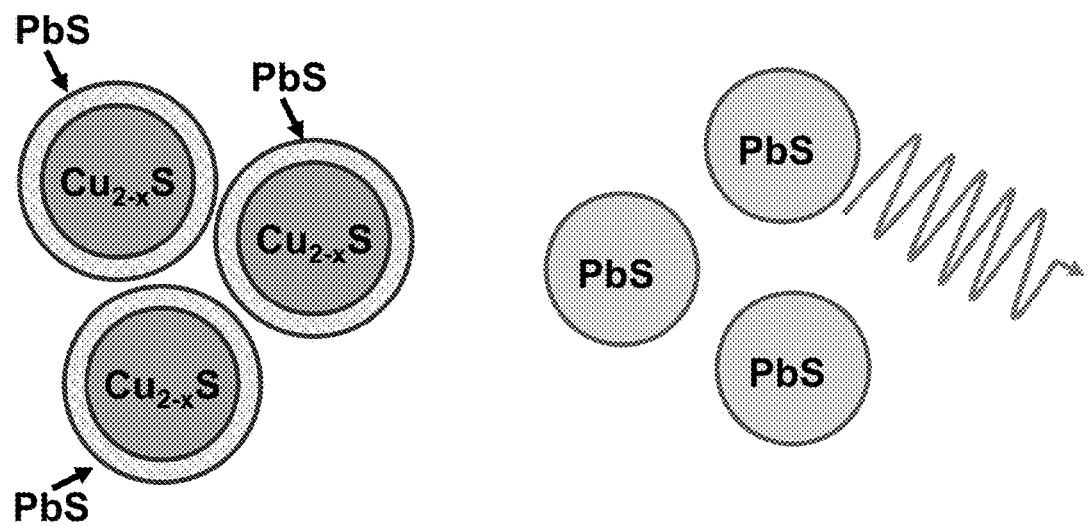

As illustrated by the block schematic shown in FIG. 2B, the present invention solves this problem by providing $Cu_{2-x}S/PbS$ core/shell nanocrystals in which the PbS shell prevents Cu from escaping and interacting with the nearby PbS nanocrystals, thereby reducing the quenching of the photoluminescence from the PbS particles. This permits the $Cu_{2-x}S/PbS$ nanocrystals to be placed in close proximity to the PbS particles without loss of the advantages produced by the Purcell effect.

These and other aspects of the present invention will be described in further detail below.

General Considerations

Figure 3:
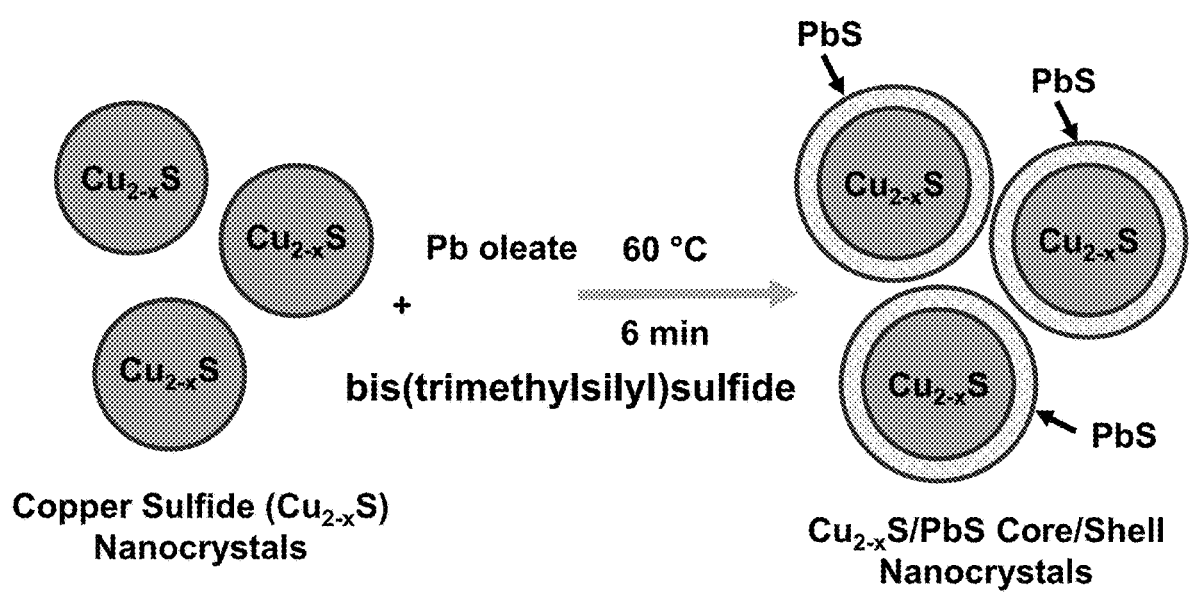
FIG. 3 is a block schematic illustrating aspects of a process for synthesizing $Cu_{2-x}S$/PbS core/shell nanocrystals in accordance with the present invention.

As described in more detail below, the $Cu_{2-x}S/PbS$ core/shell nanocrystals in accordance with the present invention are produced by a process illustrated by the block schematic in FIG. 3, wherein $Cu_{2-x}S$ cores are reacted with a solution of Pb-oleate and bis(trimethylsilyl)sulfide at 60° C. for 6 minutes.

Synthesis of the $Cu_{2-x}S/PbS$ core/shell nanocrystals and PbS nanocrystals in accordance with the present invention is performed under the conditions noted herein. Standard Schlenk-line techniques were used unless otherwise noted. All purification steps were performed in a nitrogen-filled glovebox. In the experiments performed by the inventors, oleic acid (90%), 1-octadecene (90%), lead oxide (99.999%), bis(trimethylsilyl)sulfide (synthesis grade), copper (II) acetylacetonate (≥99.9% trace metals basis), dioctyl ether (99%), 1-dodceanethiol (≥98%), hexane (anhydrous 95%), ethanol (anhydrous ≥99.5%), toluene (anhydrous 99.8%) and acetonitrile (anhydrous 99.8%), were all purchased from Sigma Aldrich, but one skilled in the art will readily recognize that any one or more of these starting materials can be obtained from any suitable source. Unless specified below, the starting materials were used as received without further purification. Flasks were heated using a heating mantle and temperature controller such as the Apollo dual temperature controller produced by J-KEM Scientific, Inc.

Synthesis of Pb-Oleate

In many embodiments, a first step in a method for making $Cu_{2-x}S/PbS$ core/shell nanocrystals in accordance with the present invention involves synthesizing Pb-oleate to be used in the reaction; it will be noted, however, that in other embodiments, previously prepared Pb-oleate or Pb-oleate obtained from other sources may also be used.

Thus, in some embodiments, to prepare the Pb-oleate, lead oxide and oleic acid were mixed and heated to 100° C. under vacuum for ~1-2 hour. The oleic acid to lead oxide mole ratio used was 3:1. As the yellow lead oxide powder reacted with the clear and colorless oleic acid to make Pb-oleate, the solution started as a yellow cloudy solution and gradually became clear and colorless.

Once the mixture was clear and colorless with no further bubbles forming under vacuum, the flask was back-filled with argon, cooled slightly, and poured into centrifuge tubes. It is important to pour the mixture while it is still warm, because if it is allowed to cool to room temperature in the flask it will become solid and be very difficult to remove from the flask.

The mixture in the centrifuge tubes was left in air over night, lightly capped, and allowed to cool to room temperature and solidify. The solid was then washed with acetone in order to remove any unreacted oleic acid. Acetone was added to each tube and the solid was broken up to suspend in the acetone, followed by centrifuging at 6000 rpm for 1 minute. The clear supernatant was discarded and the process was repeated for a total of 5 washes. The powdery white solid was then transferred to glass vials and put in a vacuum oven at room temperature and 2.5 torr for at least 12 hours. The oven was then back filled with argon and the Pb-oleate in the glass vials was stored and used in a glovebox. The Pb-oleate yield resulting from this process was around 80%.

Bis(Trimethylsilyl)Sulfide Stock Solution

As with the synthesis of the Pb-oleate described above, in some embodiments, a bis(trimethylsilyl)sulfide stock solution used in the method for making $Cu_{2-x}S/PbS$ core/shell nanocrystals in accordance with the present invention can be made as part of the process, while in other embodiments, a preexisting solution obtained from any suitable source can be used.

Thus, in some embodiments, a 0.57 M stock solution of bis(trimethylsilyl)sulfide was made by first drying 25 mL of 1-octadecene at 90° C. for 90 minutes under vacuum and then back-filling the flask with argon and letting the flask come to room temperature. The flask was then placed in a glovebox and 3.01 mL of bis(trimethylsilyl)sulfide was added, and the solution was stirred. One skilled in the art would also readily understand that other methods for making or obtaining a bis(trimethylsilyl)sulfide stock solution can be used, and solutions from all such methods or sources can be used in the method of the present invention.

$Cu_{2-x}S$ Core Reaction

As with the making of the Pb-oleate and the bis(trimethylsilyl)sulfide stock solution described above, in some embodiments, the $Cu_{2-x}S$ cores can be made as part of the process for making the core/shell nanocrystals described herein, whereas in other embodiments, preexisting $Cu_{2-x}S$ core nanocrystals can be used. Thus, in some embodiments, $Cu_{2-x}S$ core particles used for making the core/shell nanocrystals in accordance with the present invention can be made by the following process developed by Turo and MacDonald (see Michael J. Turo et al., "Crystal-Bound vs Surface-Bound Thiols on Nanocrystals," *ACS Nano* 2014, 8, 10, 10205-10213), with modifications to the heating temperature and reaction times:

0.2719 g of copper (II) acetylacetonate was combined with 5 mL of dodecanethiol and diluted, while stirring (750 rpm), with 45 mL of dioctyl ether in a 100 mL, three-necked, round-bottom flask. The flask was then put under vacuum for 30 minutes at room temperature and then was switched to an argon flow. To avoid degassing uncontrollably, the vacuum line must be opened to the flask very gradually, without initial stirring, as the polar solvents contain a lot of water.

Next, the mixture was heated under the argon flow. The heating was conducted in two steps, with the mixture first being heated to 160° C. at a rate of about 7° C./minute, and then being further heated to 200° C. at a rate of about 1.3° C/minute. In an exemplary case where the heating was performed by use of the Apollo dual temperature controller produced by J-KEM Scientific, Inc., the two-stage heating was controlled by using the "300 mL-2 mL" setting (equivalent to a variac setting of 50%) on the temperature controller, but any suitable means for controlling the heating of the mixture can be used. As the temperature of the mixture increased, its color gradually changed from a turbid light blue to a cloudy white/yellow, to transparent yellow, orange, red, and finally to brown. At 199° C., the mixture turned black and was reacted for an additional 60 minutes, starting at the color change to black. After 60 minutes, the flask was removed from heat and allowed to cool to room temperature while the mixture was stirred for about 40 minutes.

The mixture was then transferred to a $N_2$ glovebox, and divided into four centrifuge tubes. 12 mL of anhydrous ethanol was added to each tube and the mixture was centrifuged at 6000 rpm for 5 minutes. After the supernatant was decanted, each precipitate was resuspended in 0.5 mL of chloroform and mixed with 20 mL of anhydrous ethanol, which was centrifuged at 6000 rpm for 2 minutes. The supernatant was again decanted and the resulting $Cu_{2-x}S$ cores were suspended in 12 mL of anhydrous hexane. This was stored for one to two days in the glovebox, over which time a light-brown, waxy, precipitate settled at the bottom of the vial. The supernatant was then decanted into a centrifuge tube and centrifuged at 6000 rpm for 2 minutes to remove any excess precipitate. This precipitate was identified via XRD as the Cu alkanethiolate $CuSC_{12}H_{25}$. The remaining cleaned $Cu_{2-x}S$ was dried completely and were resuspended in hexane to create a solution of $Cu_{2-x}S$ nanocrystals, typically with a concentration of 29 μM.

$Cu_{2-x}S/PbS$ Core/Shell Reaction

Irrespective of whether the Pb-oleate, the bis(trimethylsilyl)sulfide, and/or the $Cu_{2-x}S$ cores are made on site or elsewhere, in accordance with the present invention, the $Cu_{2-x}S/PbS$ core/shell nanocrystals are made as described hereinbelow. The $Cu_{2-x}S/PbS$ core/shell nanocrystals can be made with varying concentrations of Pb-oleate and bis(trimethylsilyl)sulfide, but in all cases the ratio of Pb to Cu in the reaction solutions must be between 0.8 to 6.7 for the PbS shell to be formed around the $Cu_{2-x}S$ core in accordance with the present invention. In addition, it is very important that the temperature and reaction times be controlled so that undesirable results are not obtained. The temperature must be controlled so that it remains at about 60° C. (±5° C.) and not much higher because that will induce too much Cu to Pb cation exchange, such that the $Cu_{2-x}S$ plasmon is reduced/eliminated during the reaction rather than enhanced. Running the reaction past 6 minutes up to 30 minutes does not change the result, but going beyond 60 minutes will result in undesirable ripening and cation exchange.

Using the deposition method in accordance with the present invention, one or more monolayers (ML) of PbS can be formed on the surface of a $Cu_{2-x}S$ shell in order to form a $Cu_{2-x}S/PbS$ nanocrystal, where each ML of PbS represents an additional layer of either Pb or S atoms added to the surface, with an estimated diameter change of 5.9 Å per ML, which is twice the (200) d-spacing of rocksalt PbS.

As briefly described above, the process includes the steps of mixing a predetermined amount of Pb-oleate with 1-octadecene in a reaction flask within an $N_2$ glovebox; removing the flask from the glovebox and heating the mixture under an argon atmosphere to 60° C.; while maintaining the temperature of the mixture at 60° C., adding a predetermined amount of $Cu_{2-x}S$ core solution and a predetermined amount of bis(trimethylsilyl)sulfide stock solution at a Pb-oleate:bis(trimethylsilyl)sulfide molar ratio of 1.5:1 to the flask and rapidly stirring the mixture (700 rpm) for 6 minutes to form the $Cu_{2-x}S/PbS$ core/shell nanocrystals; cooling the flask to room temperature; returning the flask to the $N_2$ glovebox, adding toluene and acetonitrile to the flask; and placing the mixture in a centrifuge tube and centrifuging to precipitate to remove the $Cu_{2-x}S/PbS$ core/shell nanocrystals from the reaction mixture. The $Cu_{2-x}S$ core solution typically has a concentration of 29 μM of $Cu_{2-x}S$ nanocrystals in hexane, with 2 mL of the $Cu_{2-x}S$ core solution typically being used, but other $Cu_{2-x}S$ concentrations and other amounts of the $Cu_{2-x}S$ core solution can be used, with all such concentrations and amounts being deemed to be within the scope of the present disclosure.

The process for synthesizing $Cu_{2-x}S/PbS$ nanocrystals in accordance with the present invention is described in more detail below in the context of three different core/shell Reactions A, B, and C having varying Pb-oleate and bis(trimethylsilyl)sulfide concentrations shown in Table 1 below, where each of Reactions A, B, and C produces a $Cu_{2-x}S$/PbS core/shell nanocrystal having a predetermined shell thickness and chemical stability.

TABLE 1

Concentrations in The Three Core/Shell Reactions Reaction A, Reaction B, and Reaction C.

| Reaction Name | Pb-oleate (mM) | Bis(trimethylsilyl)sulfide (mM) | 5.9 nm Diameter Cu2-xS Cores (µM) | Pb:Cu Atomic Ratio |
|---|---|---|---|---|
| A | 15 | 10 | 2.8 | 2.4 |
| B | 61 | 41 | 2.8 | 9.6 |
| C | 127 | 85 | 2.8 | 20.0 |

In all cases, the molar ratio of Pb-oleate to bis(trimethylsilyl)sulfide used in the reaction must be 1.5:1; if it is more than 1.5:1, excess unreacted Pb-oleate will result which makes cleanup difficult, while if it is less than 1.5:1, the resulting core/shell nanocrystals become insoluble and form an aggregate such that the nanocrystals cannot be used. Similarly, the Pb to Cu ratio in the reactants must be between 0.8 and 6.7; if the Pb:Cu ratio is less than 0.8, the PbS shell growth is too slow, while if it is greater than 6.7, a mixture of products are formed due to a significant amount of cation exchange occurring which results in some of the $Cu_{2-x}S$ cores cation exchanging all the way to PbS nanocrystals, while others become $Cu_{2-x}S$/PbS core/shell particles as planned.

For core/shell Reaction A, 0.244 g of Pb-oleate was mixed with 18.63 mL of 1-octadecene in a 50 mL, three-necked, round bottom flask within a $N_2$ glovebox. The Pb-oleate/1-octadecene mixture was then removed from the $N_2$ glovebox and heated under argon to 60° C. and maintained at that temperature. The white Pb-oleate powder dissolved around 37° C. as the solution was heated and a clear colorless solution was obtained. In a next step, 2 mL of the $Cu_{2-x}S$ solution in hexane and 0.37 mL of the 0.57 M bis(trimethylsilyl)sulfide stock solution, both at room temperature, were injected simultaneously into the 60° C. Pb-oleate solution. The reaction was light brown to start, from the $Cu_{2-x}S$ cores, and slowly got darker as the reaction progressed due to the nucleation of PbS. At 6 minutes the reaction was quenched in an ethanol/acetone bath and brought back into the glovebox for purification.

For core/shell Reaction B, 0.98 g of Pb-oleate was mixed with 17.5 mL of 1-octadecene. This mixture was heated to 60° C. and 2 mL of the $Cu_{2-x}S$ solution in hexane and 1.5 mL of the 0.57 M bis(trimethylsilyl)sulfide stock solution, both at room temperature, were injected simultaneously. At 6 minutes the reaction was quenched in an ethanol/acetone bath and brought back into the glovebox for purification.

For core/shell reaction C, 2.05 g of Pb-oleate was mixed with 15.88 mL of 1-octadecene. This mixture was heated to 60° C. and 2 mL of the $Cu_{2-x}S$ solution in hexane and 3.12 mL of the 0.57 M bis(trimethylsilyl)sulfide stock solution, both at room temperature, were injected simultaneously. At 6 minutes the reaction was quenched in an ethanol/acetone bath and brought back into the glovebox for purification.

In all cases, in addition to the $Cu_{2-x}S$/PbS core/shell nanocrystals, the reaction also results in the formation of homogeneously nucleated PbS nanocrystals, as well as residual unreacted precursors and byproducts.

Thus, in an additional step in the method in accordance with the present invention, the $Cu_{2-x}S$/PbS core/shell nanocrystals can be separated from these unreacted precursors, byproducts, and homogeneously nucleated PbS and extracted from the reaction vessel through a purification process.

In this purification process, the solution containing the $Cu_{2-x}S$/PbS core/shell nanocrystals is mixed with 30 mL of toluene and 22 mL of acetonitrile and centrifuged at 6000 rpm for 5 minutes. In this first purification step the $Cu_{2-x}S$/PbS core/shells precipitate from the solution and are separated from the majority of the unreacted precursors and byproducts, although homogenously nucleated PbS nanocrystals remain with the core/shell nanocrystal. The homogenously nucleated PbS nanocrystals typically have a diameter of about 3 nm, while the $Cu_{2-x}S$/PbS core/shell nanocrystals have a diameter of about 5-7 nm, and so the two different particles can be separated from each other via size-selective precipitation known in the art, using toluene and acetonitrile as the solvent/non-solvent pair. Size-selective precipitation is repeated until no homogenously nucleated PbS nanocrystals are detected by absorbance, photoluminescence, bright-field transmission electron microscopy, or other suitable means.

The reactions given in Table 1 can be scaled up to produce more $Cu_{2-x}S$/PbS core/shell nanocrystals if required.

Figure 4:
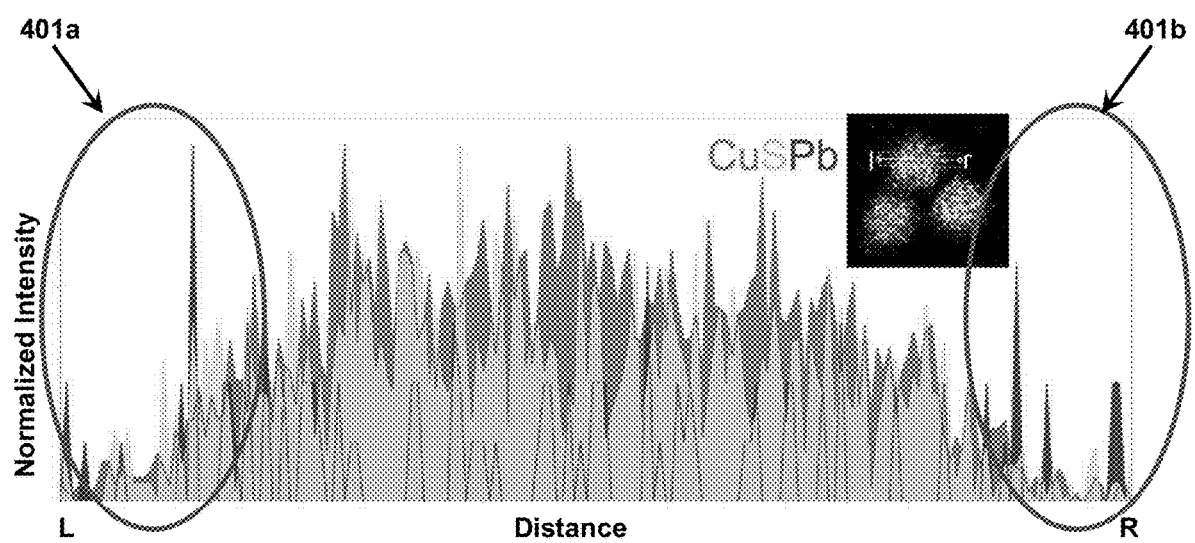
FIG. 4 is a linescan image illustrating how a $Cu_{2-x}S$/PbS core/shell nanocrystal produced in accordance with the present invention has $Cu_{2-x}S$ largely confined to the center of the crystal, with PbS confined to the outer edges, i.e., the surface, of the crystal.

Pb-oleate and bis(trimethylsilyl)sulfide concentrations below that of Reaction A result in $Cu_{2-x}S$/PbS core/shell nanocrystals having a PbS shell thinner than that of Reaction A and thus less chemical stability than in Reaction A. Pb-oleate and bis(trimethylsilyl)sulfide concentrations larger than that of Reaction C result in a mixture of $Cu_{2-x}S$/PbS core/shell nanocrystals and PbS nanocrystals from some of the $Cu_{2-x}S$ cores cation exchanging completely to PbS. Using high-angle annular dark field scanning transmission electron microscopy (HAADF-STEM) energy dispersive spectroscopy (EDS) it was shown that for Pb-oleate and bis(trimethylsilyl)sulfide concentrations between those of Reactions A and C, the core of the core/shell nanocrystals is $Cu_{2-x}S$ and the shell is PbS, as illustrated by the EDS linescan spectrum shown in FIG. 4, which shows that the Cu is confined to the core (at the center of the FIGURE), while the Pb 401a/401b is confined to the outer surfaces of the crystal (at the left and right regions of the FIGURE).

Operation and Use

The $Cu_{2-x}S$ and $Cu_{2-x}S$/PbS core/shell nanocrystals were mixed with PbS nanocrystals to investigate their chemical stability and effect on the photoluminescence of the PbS nanocrystals. Individually, $Cu_{2-x}S$ or $Cu_{2-x}S$/PbS core/shell nanocrystals and PbS nanocrystals were suspended in 4 mL of tetrachloroethylene. The photoluminescence and absorbance were measured for these individual samples. Subsequently, the nanocrystals were dried under $N_2$ to remove the tetrachloroethylene. Next, the dried nanocrystals were mixed together ($Cu_{2-x}S$ or $Cu_{2-x}S$/PbS+PbS) and suspended in 4 mL of tetrachloroethylene total. The photoluminescence and absorbance were then measured for the mixed sample. For long-term stability measurements, the mixed sample is again dried under $N_2$ and either stored dry or stored suspended in hexane.

Figure 5A:
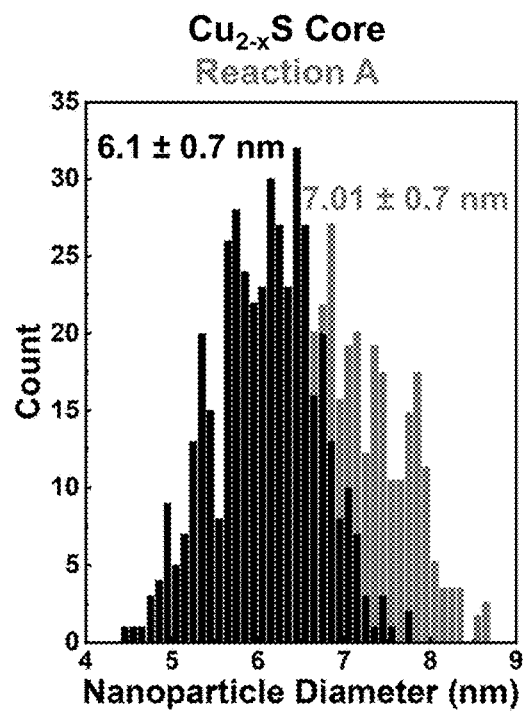
FIGS. 5A-5C are plots illustrating the diameters of a $Cu_{2-x}S$ cores and $Cu_{2-x}S$/PbS core/shell nanocrystals produced by three different core/shell reactions having different amounts of the starting materials Pb-oleate and bis(trimethylsilyl)sulfide stock solution in accordance with the present invention.
Figure 5B:
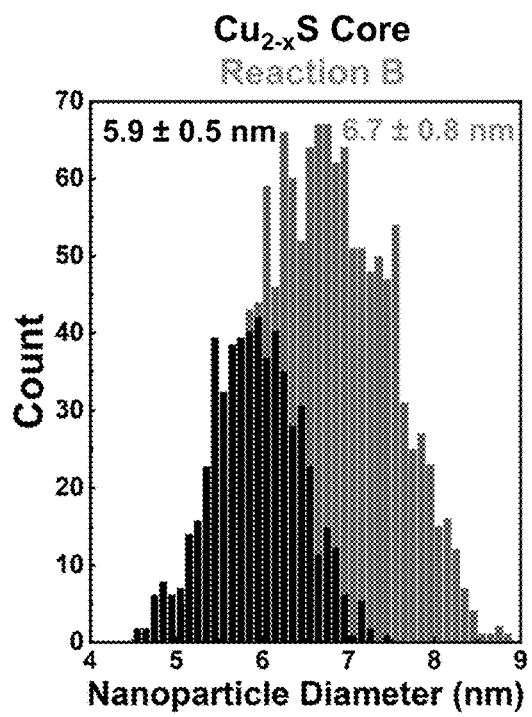
Figure 5C:
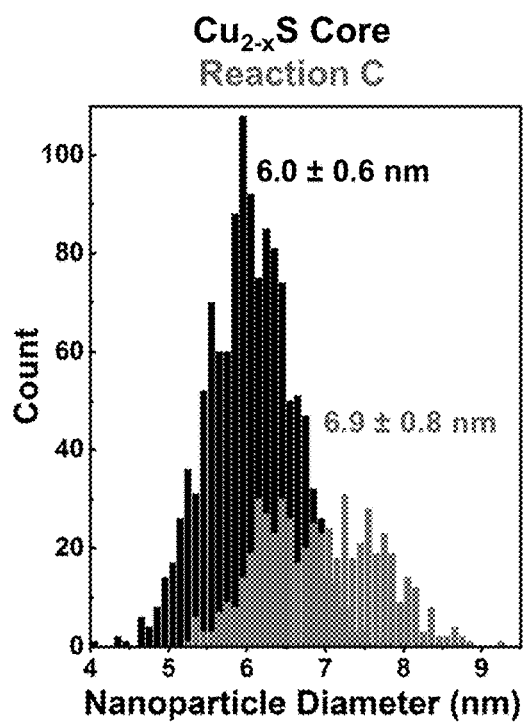

The plots in FIGS. 5A-5C are histograms of the diameters of the $Cu_{2-x}S$ cores compared to the $Cu_{2-x}S/PbS$ core/shells made from each core, with the average diameters of the cores and core/shell being noted above the histograms in each of FIGS. 5A-5C. As can be seen from the plots in FIGS. 5A-5C, the core/shell diameter histograms are clearly shifted to larger diameters as compared to the diameters of the cores alone, indicating that PbS is deposited on the $Cu_{2-x}S$ cores in each of Reactions A, B, and C, with all three of Reactions A, B, and C increasing the diameter of the nanocrystals by about 0.9 nm, which corresponds to a deposition of a PbS shell having of approximately 1.5 ML of PbS. By definition, one full PbS monolayer adds a S atom to all Cu/Pb-terminated atoms and a Pb atom to all S-terminated atoms; the fractional second monolayer suggests that the PbS shell deposition does not occur in discrete layers, but instead proceeds in a continuum.

Figure 6A:
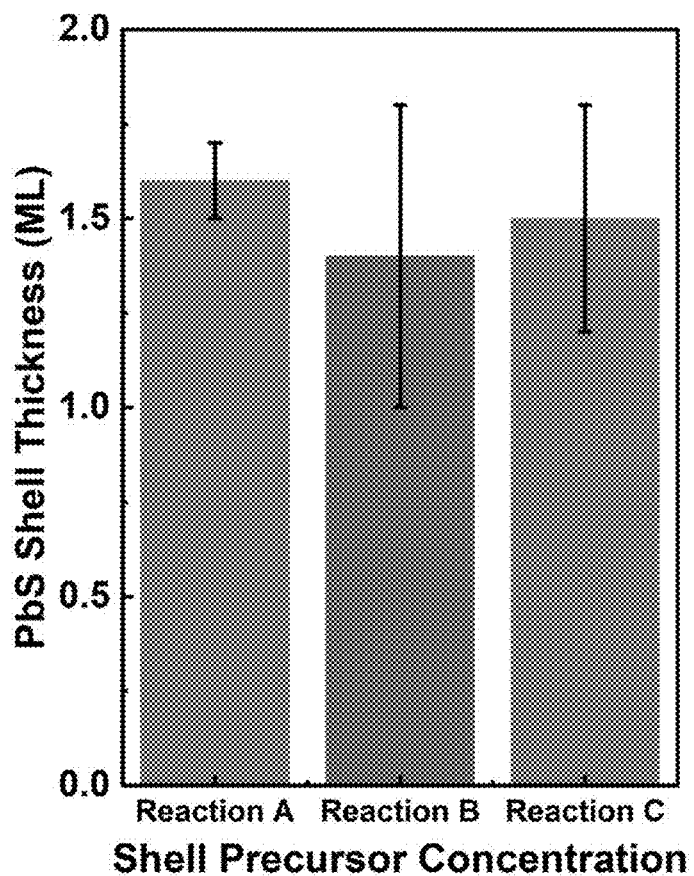
FIG. 6A is a block schematic illustrating how the increase in diameter after reactions A, B, and C is equivalent to about 1.5 monolayers of PbS.
Figure 6B:
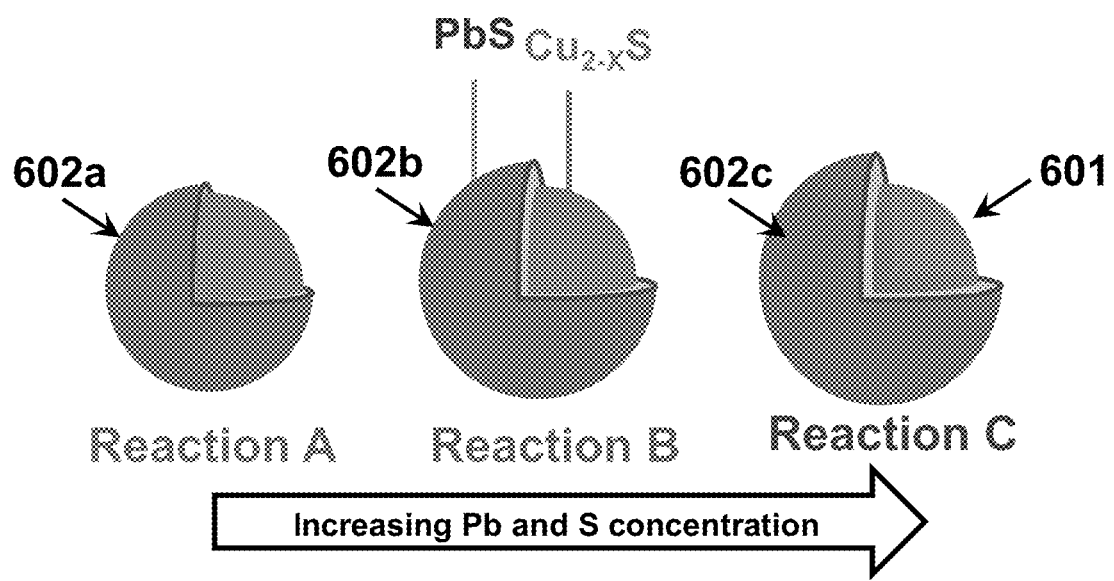
FIG. 6B illustrates that the PbS shell thickness increases from Reaction A to Reaction B to Reaction C.

The block schematic in FIG. 6A illustrates that the PbS shell thickness, as measured by the change in diameter after the core/shell reaction, is the same sample for each of the starting material concentrations in Reactions A, B, and C. However, as described in more detail below, the chemical stability of the $Cu_{2-x}S/PbS$ core/shell nanocrystals increases as the reaction concentration increases from Reaction A to Reaction C. Using the overall diameter change to measure the PbS shell thickness only takes into account shell growth via the direct deposition of PbS; it does not account for shell growth via Cu to Pb cation exchange, since cation exchange does not increase the overall diameter. Cation exchange can increase with incoming atom concentration, and thus the PbS shell also increases with core/shell reaction concentration as is shown in FIG. 6B, where the PbS shell produced by Reaction A has a thickness 602a, one produced by Reaction B has thickness 602b, and one produced by Reaction C has thickness 602c. See L. De Trizio et al., "Forging Colloidal Nanostructures Via Cation Exchange Reactions," *Chemical Reviews* 2016, 116 (18) 10852-10887.

Figure 7A:
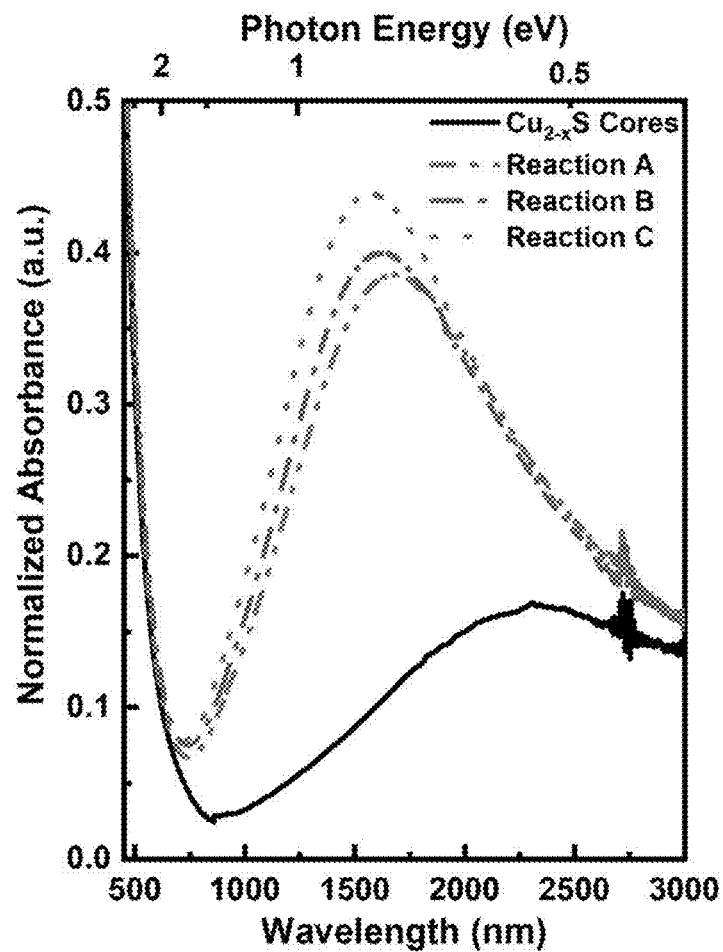
FIG. 7A illustrates the way in which a predetermined change in the blueshift produced by the presence of a PbS shell on a $Cu_{2-x}S$ core can be obtained by tailoring he concentrations of the Pb-oleate and bis(trimethylsilyl)sulfide stock solution in the core/shell reaction producing a $Cu_{2-x}S$/PbS core/shell nanocrystal in accordance with the present invention.
Figure 7B:
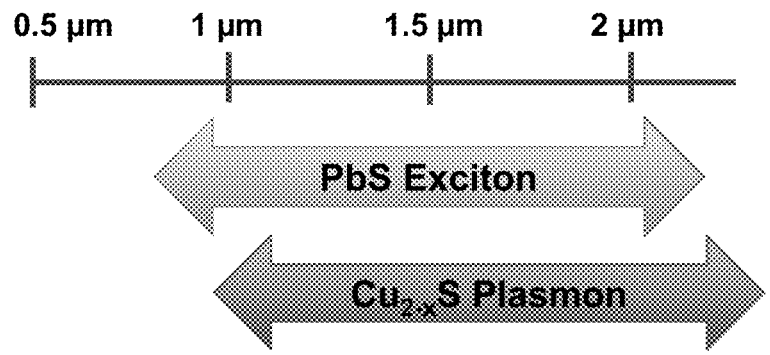
FIG. 7B demonstrates that this blueshift allows the $Cu_{2-x}S$ plasmon energy to overlap with PbS nanocrystal excitonic energies.

The plot in FIG. 7A illustrates this phenomenon. The $Cu_{2-x}S/PbS$ core/shell nanocrystals produced by Reaction A enhance and blueshift the $Cu_{2-x}S$ core plasmon from ~2500 nm to 1662 nm. Increasing the Pb-oleate and bis(trimethylsilyl)sulfide concentrations from those in Reaction A to those in Reaction C, i.e., Pb-oleate from 15 to 127 millimolar (mM) and bis(trimethylsilyl)sulfide from 10 to 85 mM, continues to blueshift the $Cu_{2-x}S$ core plasmon, going from 1662 nm to 1620 nm to 1570 nm, as shown in FIG. 7A. This blueshift is a great advantage since it allows the $Cu_{2-x}S$ plasmon energy to overlap better with the energy of PbS nanocrystal excitons, which is a requirement for strong exciton-plasmon coupling such as is shown in FIG. 7B.

When the absorbance in FIG. 7A is normalized at 400 nm, which is an energy well above the bandgap and plasmonic feature, see I. Moreels, et al., "Size-Dependent Optical Properties of Colloidal PbS Quantum Dots," *ACS Nano* 2009, 3 (10) 3023030, the intensity of the plasmon increases with increasing PbS shell thickness. Because the resonance energy of doped plasmonic semiconductors increases with increasing carrier density, and in the case of $Cu_{2-x}S$ with increasing Cu vacancies, this trend suggests that as the Pb shell is added, the $Cu_{2-x}S$ becomes less Cu-rich.

Figure 8:
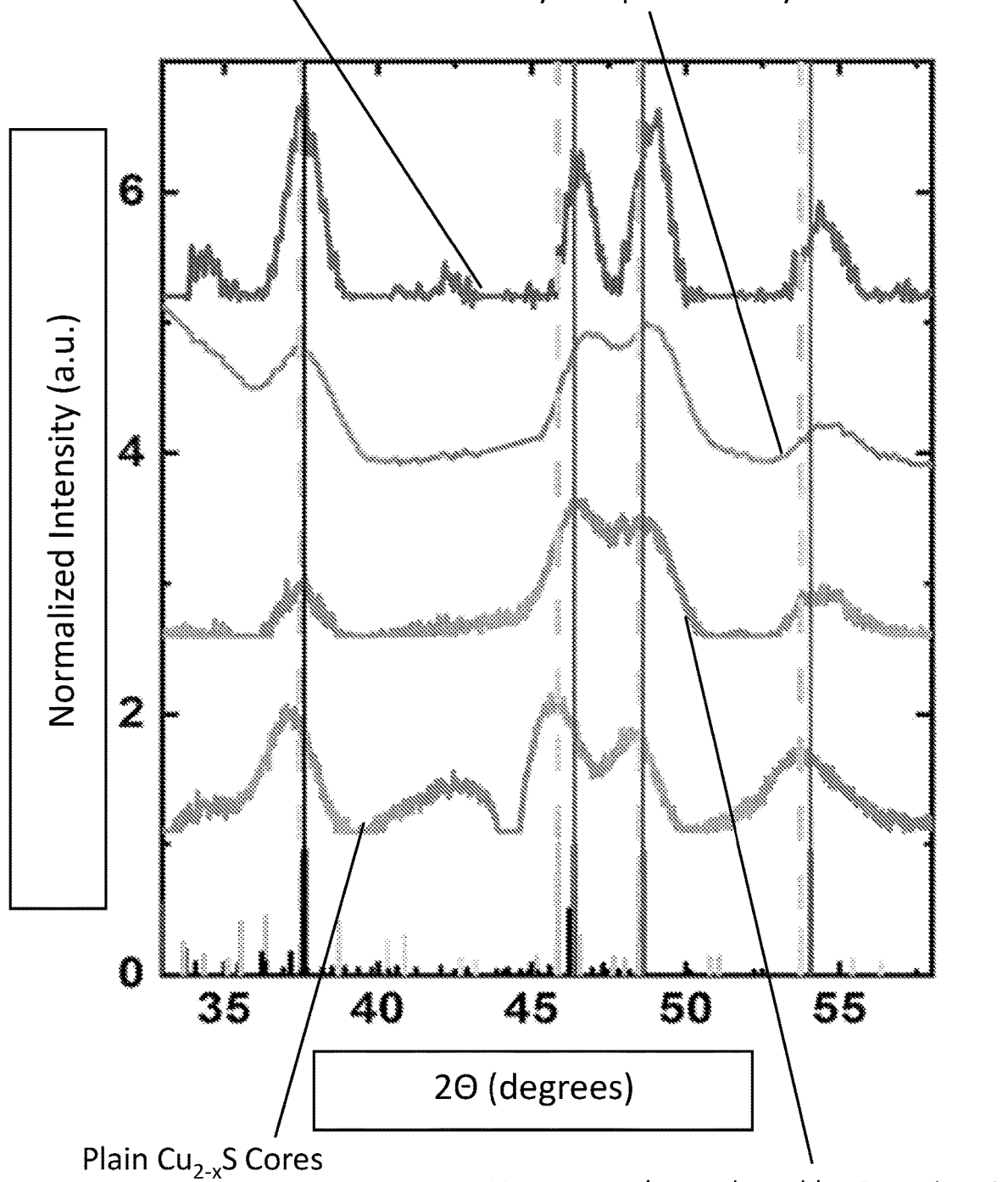
FIG. 8 is a plot illustrating that the crystal structure of the $Cu_{2-x}S$ core, as determined by X-ray diffraction, becomes less low-chalcocite and more djurleite from Reaction A to Reaction B to Reaction C.

This is in agreement with the X-ray diffraction (XRD) data shown by the plot in FIG. 8, which plots the X-ray diffraction patterns collected from plain $Cu_{2-x}S$ cores, as well as $Cu_{2-x}S/PbS$ core/shell nanocrystals produced by Reaction A, Reaction B, and Reaction C. These patterns have all been normalized to one at the peak around $2\theta=46°$, and then offset in a waterfall for clarity, with the y-axis representing the normalized intensity. The vertical lines indicate the powder diffraction patterns of monoclinic low chalcocite $Cu_{2-x}S$ (dashed line) and monoclinic djurleite $Cu_{2-x}S$ (solid line). As the core/shell reactions go from Reaction A to Reaction B and to Reaction C, the peak near $2\theta=46°$ shifts to higher $2\theta$ values, which demonstrates that the $Cu_{2-x}S$ cores become less low chalcocite (Cu rich phase) and more djurleite (less Cu rich phase) as the core/shell reaction precursor concentrations increase.

Figure 9A:
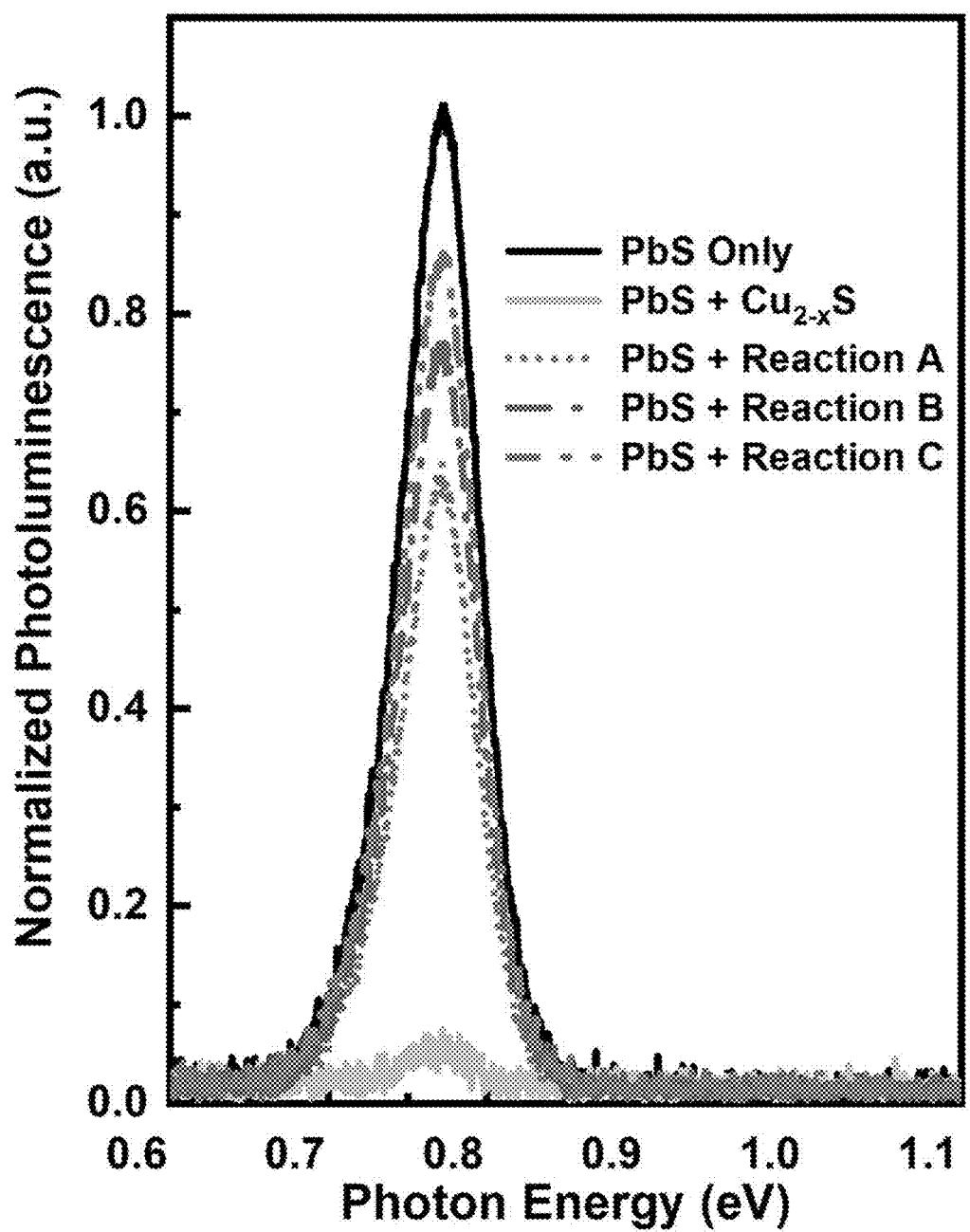
FIGS. 9A-9C are plots illustrating that the PbS shell hinders the $Cu_{2-x}S$ cores from quenching the photoluminescence of neighboring PbS nanocrystals in solution.

The PbS shells on the $Cu_{2-x}S/PbS$ core/shell nanocrystals in accordance with the present invention also protect neighboring PbS nanocrystals from total photoluminescence quenching, as illustrated in the plot shown in FIG. 9A. With increasing PbS thickness, the $Cu_{2-x}S$ cores quench neighboring PbS excitons in solution less and less, which allows the $Cu_{2-x}S/PbS$ core/shell to be mixed in solution with PbS nanocrystals for binary superlattice assembly without the PbS luminescence being quenched. These binary superlattices with luminescent PbS nanocrystals can be tuned to optimize the Purcell effect to enhance performance of infrared optoelectronics. As described above, the thickness of the PbS shell is determined by both the amount of PbS deposited onto the $Cu_{2-x}S$ cores, and by the amount of PbS created from Cu to Pb cation exchange within the $Cu_{2-x}S$ cores. Increasing the PbS shell precursor concentrations does not change the amount of PbS deposition onto the $Cu_{2-x}S$ cores, but it does increase the amount of PbS created from Cu to Pb cation. Thus, in this way, the $Cu_{2-x}S/PbS$ core/shell nanocrystals made in accordance with the present invention can be tailored to provide a predetermined reduction in quenching of the neighboring PbS excitons.

Figure 9B:
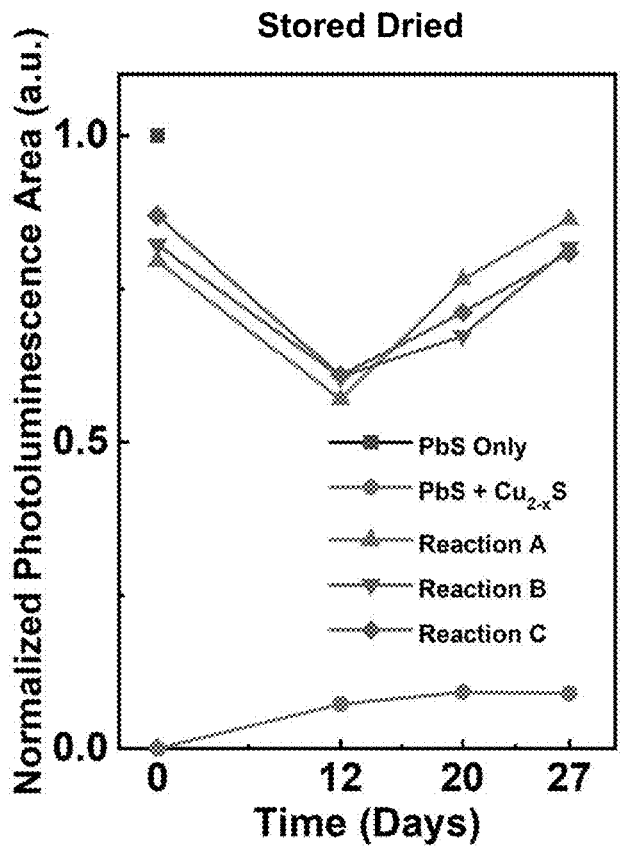
Figure 9C:
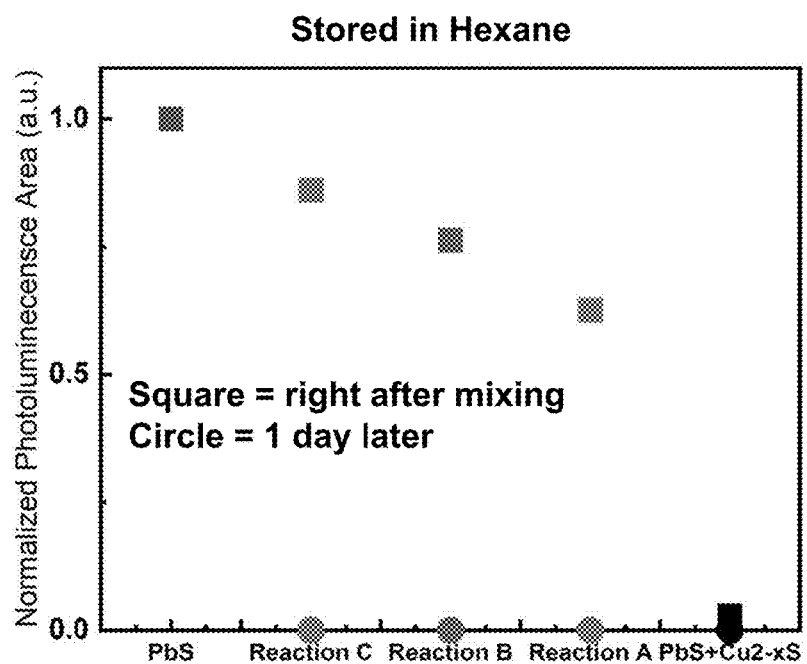
Figure 10A:
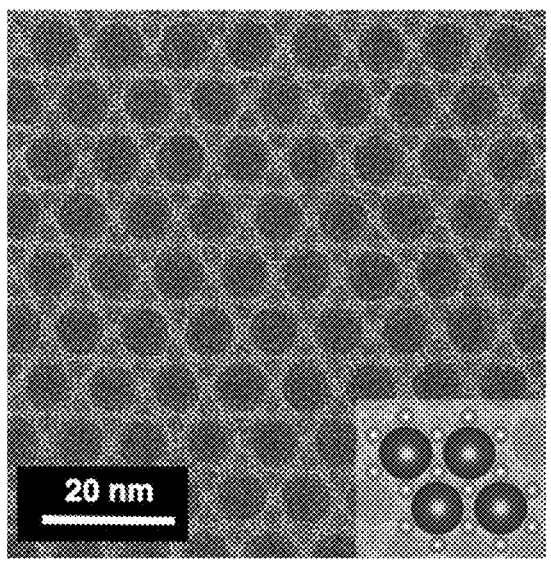
FIGS. 10A-10D are bright-field transmission electron microscopy images showing exemplary binary superlattices that can be formed from PbS nanocrystals and $Cu_{2-x}S$/PbS core/shell nanocrystals synthesized in accordance with the present invention.
Figure 10B:
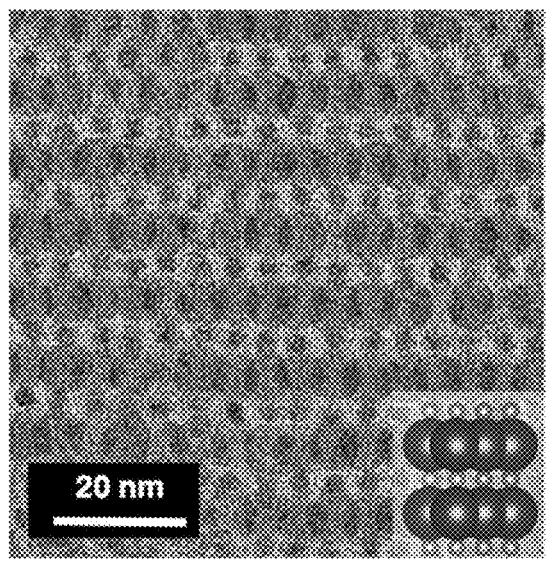
Figure 10C:
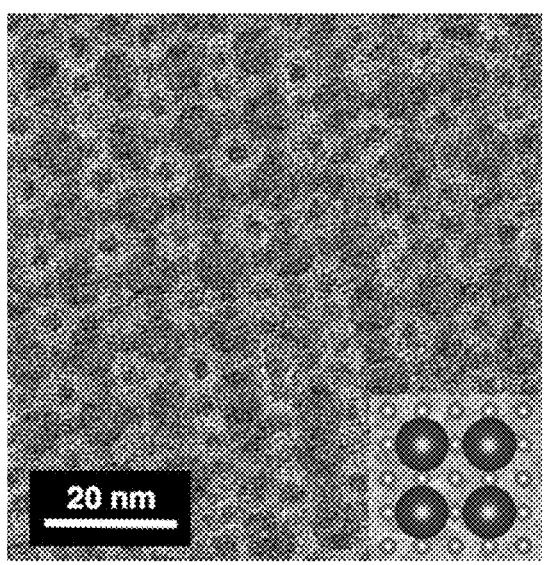
Figure 10D:
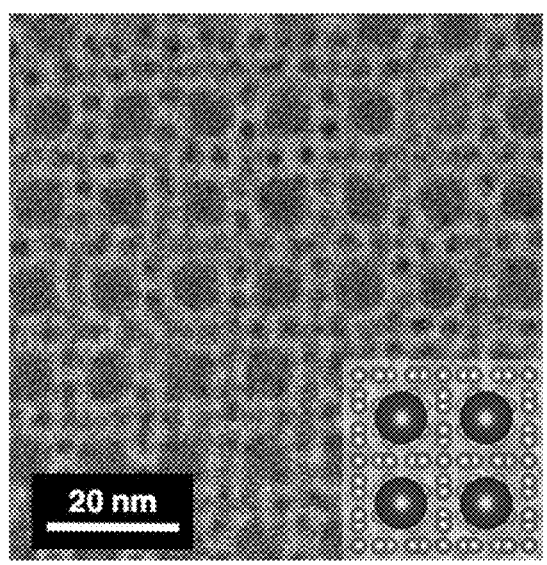

This stability is maintained over time when the $Cu_{2-x}S/PbS$ core/shell and PbS nanocrystal mixtures are stored dry; however, the PbS nanocrystal photoluminescence is quenched when the mixtures are stored as a solution, such as in hexane. This is shown by the plot in FIG. 9B, which shows that storing the $Cu_{2-x}S/PbS$ core/shell and PbS nanocrystal mixtures as a dried out solid in an inert atmosphere allows the PbS nanocrystal exciton to remain stable, as shown in FIG. 9B. In contrast, as shown in FIG. 9C, storing the $Cu_{2-x}S/PbS$ core/shell and PbS nanocrystal mixture as a solution in hexane causes the PbS nanocrystal excitons to be quenched within one day.

The ability to tailor the reduction in quenching of the neighboring PbS excitons by controlling the amounts of the PbS shell precursors used to form the $Cu_{2-x}S/PbS$ core/shell nanocrystals in accordance with the present invention in turn allows the formation of binary superlattices of $Cu_{2-x}S/PbS$ core/shell nanocrystals and PbS nanocrystals, such as those illustrated in FIGS. 10A-10D. The formation of these superlattices is made possible by the fact that the PbS shell adds increased solubility to larger (>8 nm) $Cu_{2-x}S$ nanocrystals and provides the chemical stability required for the PbS nanocrystals to not be totally quenched during the assembly process. These superlattices enable infrared exciton-plasmon coupling to occur which will lead to enhanced infrared optoelectronic devices such as photodetectors. The binary lattice structures have known, uniform, and tunable distances between the plasmonic $Cu_{2-x}S/PbS$ core/shells and the excitonic PbS nanocrystals. Thus, by changing the binary lattice structure, one can change this distance and thus optimize the excitonic-plasmonic coupling to maximize device performance. Superlattices that can be formed from the $Cu_{2-x}S/PbS$ core/shell and PbS nanocrystals in accordance with the present invention can have the exemplary lattice structures shown in FIGS. 10A-10D, which are analogous to the known lattice structures of $AlB_2$, CuAu, $Cu_3Au$, and $NaZn_{13}$, respectively. Superlattices having other structures may be formed from the $Cu_{2-x}S$/PbS core/shell and PbS nanocrystals, and all such superlattice structures are deemed to be within the scope and spirit of the present invention. Each of these structures has a different number of nearest neighbors and average spacing between the plasmonic $Cu_{2-x}S$/PbS core/shell nanocrystals and the excitonic PbS nanocrystals. This tunability will allow for the optimization of the Purcell effect in these hybrid nanostructures.

Figure 11:
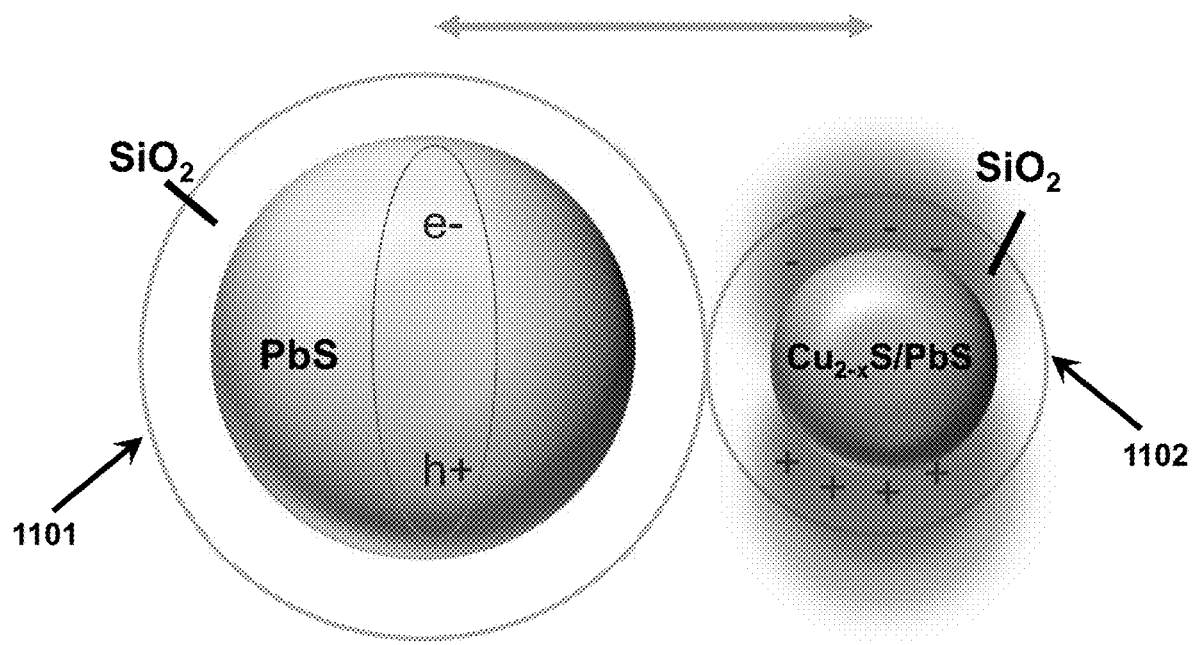
FIG. 11 is a block schematic illustrating the way in which an additional $SiO_2$ shell can be formed on PbS nanocrystals and $Cu_{2-x}S$/PbS core/shell nanocrystals synthesized in accordance with the present invention to control the distance between the excitonic PbS and the plasmonic $Cu_{2-x}S$/PbS core/shell nanocrystal so as to optimize the Purcell effect in dimers formed by the two particles.

In other embodiments of the present invention, as illustrated in FIG. 11, a highly uniform amorphous $SiO_2$ 1101/1102 shell can be formed on PbS nanocrystals and $Cu_{2-x}S$/PbS core/shell nanocrystals formed by the method described above. This $SiO_2$ shell can be formed using any suitable technique that allows for precise control of the $SiO_2$ shell thickness, such as by means of a water-in-oil reverse microemulsion synthesis technique known in the art. By precisely controlling the thickness of the $SiO_2$ shell on the PbS nanocrystals and the $Cu_{2-x}S$/PbS core/shell nanocrystals, the distance between the semiconductor PbS and the plasmonic $Cu_{2-x}S$/PbS core/shell nanocrystals can be controlled so as to optimize the Purcell effect in dimers formed by the two particles. This in turn will enable the use of such particles as single-photon emitters with enhanced brightness, due to the optimized exciton-plasmon coupling provided by the tunable $SiO_2$ layer between the plasmonic $Cu_{2-x}S$/PbS core/shell nanocrystal and the excitonic PbS nanocrystal.

Advantages and New Features

The present invention provides increased solubility of large (>8 nm) $Cu_{2-x}S$ nanocrystals for binary superlattices of $Cu_{2-x}S$/PbS core/shell and PbS nanocrystals for controllable and optimized infrared exciton and plasmon coupling for enhanced optoelectronics such as infrared detectors.

The PbS shell on the $Cu_{2-x}S$ core prevents total quenching of neighboring PbS nanocrystals and thus allows for optimized infrared exciton-plasmon coupling to occur for enhanced optical properties such as enhanced absorption and emission due to the Purcell effect.

The present invention also enables the production of enhanced and blue-shifted plasmons which overlap in energy with excitonic PbS nanocrystals. This overlap leads to stronger exciton-plasmon coupling and thus enhanced absorption and emission due to the Purcell effect.

Finally, as noted above, the present invention allows for the deposition of a $SiO_2$ shell on $Cu_{2-x}S$/PbS core/shell nanocrystals. Without the PbS shell, the $SiO_2$ shell cannot be deposited on the $Cu_{2-x}S$ nanocrystals using the water-in-oil reverse microemulsion synthesis technique, which permits the distance between the semiconductor PbS and the plasmonic $Cu_{2-x}S$/PbS core/shell nanocrystals to be controlled so as to optimize the Purcell effect in dimers formed by the two particles.

Thus, the present invention is the first that enables the creation of $Cu_{2-x}S$/PbS core/shell nanocrystals having the potential to couple excitons and plasmons in the infrared in a hybrid nanostructure composed of a binary superlattice composed of both $Cu_{2-x}S$/PbS core/shell nanocrystals and PbS nanocrystals. The first three purposes of this invention enables the $Cu_{2-x}S$/PbS core/shell and PbS binary superlattice method to be realized for coupling infrared excitons and plasmons for enhanced nanocrystal optical properties for low size, weight, power, and cost absorption devices such as infrared detectors. The last purpose of this invention enables enhanced brightness of low size, weight, power, and cost single-photon emitters in the telecommunication region.

Although particular embodiments, aspects, and features have been described and illustrated, one skilled in the art would readily appreciate that the invention described herein is not limited to only those embodiments, aspects, and features but also contemplates any and all modifications and alternative embodiments that are within the spirit and scope of the underlying invention described and claimed herein. The present application contemplates any and all modifications within the spirit and scope of the underlying invention described and claimed herein, and all such modifications and alternative embodiments are deemed to be within the scope and spirit of the present disclosure.

What is claimed is:

1. A process for synthesizing core/shell nanocrystals, wherein each of the core/shell nanocrystals includes a respective copper sulfide core and a respective lead sulfide shell, the process comprising:
    mixing an amount of Pb-oleate with 1-octadecene reaction flask within an $N_2$ glovebox to form a Pb-oleate mixture;
    removing the flask from the glovebox and heating the Pb-oleate mixture under an argon atmosphere to 60° C.;
    while maintaining the temperature of the Pb-oleate mixture at 60° C., adding an amount of copper sulfide core hexane solution and an amount of bis(trimethylsilyl)sulfide stock solution to the Pb-oleate mixture to form a reaction mixture, the amount of Pb-oleate and the amount of bis(trimethylsilyl)sulfide stock solution being maintained at a Pb-oleate:bis(trimethylsilyl)sulfide molar ratio of 1.5:1;
    rapidly stirring the reaction mixture for 6 minutes to form the core/shell nanocrystals from the reaction mixture, wherein each the core/shell nanocrystals includes the respective copper sulfide core and the respective lead sulfide shell;
    cooling the flask to room temperature;
    returning the flask to the $N_2$ glovebox and adding toluene and acetonitrile to the flask in the $N_2$ glovebox;
    removing the reaction mixture from the flask and placing it in a centrifuge tube; and
    centrifuging the reaction mixture to precipitate and remove the core/shell nanocrystals from the reaction mixture;
    wherein the amount of Pb-oleate and the amount of bis(trimethylsilyl)sulfide stock solution are configured to produce number of lead sulfide monolayers on each of the copper sulfide cores.

2. The process according to claim 1, further comprising adding toluene and acetonitrile to the reaction mixture and centrifuging the reaction mixture to precipitate out homogeneously nucleated lead sulfide nanocrystals from the reaction mixture via size-selective precipitation.

3. The process according to claim 1, wherein the reaction mixture comprises a 15 milllimolar (mM) concentration of Pb-oleate and a 10 mM concentration of bis(trimethylsilyl)sulfide.

4. The process according to claim 1, wherein the reaction mixture comprises a 61 milllimolar (mM) concentration of Pb-oleate and a 41 mM concentration of bis(trimethylsilyl)sulfide.

5. The process according to claim 1, wherein the reaction mixture comprises a 127 milllimolar (mM) concentration of Pb-oleate and a 85 mM concentration of bis(trimethylsilyl)sulfide.

6. A core/shell nanocrystal produced by the process of claim 1.

7. A core/shell nanocrystal comprising a copper sulfide core with a lead sulfide shell.

8. The core/shell nanocrystal according to claim 7, further comprising an $SiO_2$ shell.

9. The core/shell nanocrystal according to claim 8, wherein the lead sulfide shell surrounds the copper sulfide core, and wherein the $SiO_2$ shell surrounds the lead sulfide shell.

10. The core/shell nanocrystal according to claim 7, wherein the core/shell nanocrystal has a diameter in the range of about 5.9 nm to about 7.7 nm.

11. A dimer comprising:
a core/shell/shell nanocrystal having a copper sulfide core, a lead sulfide shell on the copper sulfide core, and a first $SiO_2$ shell on the lead sulfide shell; and
a core/shell nanocrystal comprising a lead sulfide core having a second $SiO_2$ shell formed on the lead sulfide core;
wherein the first and second $SiO_2$ shells are configured to provide a distance between the copper sulfide core and the lead sulfide core defined by thicknesses of the first and second $SiO_2$ shells.

12. A superlattice comprising:
a plurality of core/shell nanocrystals, wherein each of the core/shell nanocrystals includes a copper sulfide core and a lead sulfide shell; and
a plurality of lead sulfide nanocrystals;
wherein the core/shell nanocrystals and the lead sulfide nanocrystals are arranged in a lattice structure.

13. The superlattice according to claim 12, wherein the lattice structure is analogous to the lattice structure in an $AlB_2$ superlattice.

14. The superlattice according to claim 12, wherein the lattice structure is analogous to the lattice structure in a CuAu superlattice.

15. The superlattice according to claim 12, wherein the lattice structure is analogous to the lattice structure in a $Cu_3Au$ superlattice.

16. The superlattice according to claim 12, wherein the lattice structure is analogous to the lattice structure in a $NaZn_{13}$ superlattice.

17. The superlattice according to claim 12, wherein each of the core/shell nanocrystals further includes an $SiO_2$ shell on the lead sulfide shell.

18. The superlattice according to claim 17, wherein each of the copper sulfide cores is surrounded by the respective lead sulfide shell, and wherein each of the lead sulfide shells is surrounded by the respective $SiO_2$ shell.

19. The superlattice according to claim 12, wherein each of the lead sulfide nanocrystals has an $SiO_2$ shell thereon.

20. The superlattice according to claim 19, wherein each of the lead sulfide nanocrystals is surrounded by the respective $SiO_2$ shell thereon.

* * * * *